United States Patent

Gravely et al.

[11] Patent Number: 6,050,163
[45] Date of Patent: Apr. 18, 2000

[54] SAW BLADE HAVING LIQUID TRANSPORT CAVITY FOR USE WITH LUBRICATING GUIDE SUPPORT ASSEMBLY

[75] Inventors: Robert Wayne Gravely, Denton; Michael Monroe Lee, Wingate, both of N.C.

[73] Assignee: Cutting Edge Designs, L.L.C., Denton, N.C.

[21] Appl. No.: 09/232,401

[22] Filed: Jan. 15, 1999

[51] Int. Cl.[7] .................................................. B26D 1/00
[52] U.S. Cl. .................................. 83/22; 83/169; 83/171; 83/821
[58] Field of Search ................... 83/22, 169, 171, 83/821; 451/7, 53; 125/15

[56] References Cited

U.S. PATENT DOCUMENTS

| | | |
|---|---|---|
| 193,004 | 7/1877 | Jenks . |
| D. 264,675 | 6/1982 | Inaga et al. ................. D8/20 |
| D. 266,001 | 8/1982 | Wertheimer ................. D8/70 |
| D. 277,930 | 3/1985 | Croydon ..................... D8/70 |
| D. 277,931 | 3/1985 | Croydon ..................... D8/70 |
| D. 293,074 | 12/1987 | Inoue ......................... D8/70 |
| 343,405 | 6/1886 | Smith et al. . |
| D. 368,419 | 4/1996 | Dorma ........................ D8/70 |
| D. 382,185 | 8/1997 | Gakhar et al. .............. D8/70 |
| D. 382,186 | 8/1997 | Gakhar et al. .............. D8/70 |
| D. 382,786 | 8/1997 | Achterberg et al. ......... D8/70 |
| D. 382,787 | 8/1997 | Gakhar et al. .............. D8/70 |
| D. 383,368 | 9/1997 | Achterberg et al. ......... D8/74 |
| D. 388,318 | 12/1997 | Achterberg et al. ......... D8/70 |
| D. 390,435 | 2/1998 | Matsumoto .................. D8/70 |
| D. 390,436 | 2/1998 | Vaagen ....................... D8/70 |
| D. 392,864 | 3/1998 | Koike et al. ................. D8/70 |
| 452,408 | 5/1891 | Zumbro . |
| 927,164 | 7/1909 | Puffer ......................... 125/15 |
| 3,156,274 | 11/1964 | Golick . |
| 3,285,302 | 11/1966 | Thrasher . |
| 3,580,305 | 5/1971 | Wright . |
| 3,623,520 | 11/1971 | Neild . |
| 3,645,304 | 2/1972 | Thrasher . |
| 3,674,065 | 7/1972 | Fairfield, Jr. et al. . |
| 3,688,820 | 9/1972 | Lundblom . |
| 3,703,915 | 11/1972 | Pearson ....................... 83/169 |
| 3,747,276 | 7/1973 | Bridwell et al. ............. 451/53 |
| 3,750,503 | 8/1973 | McMillan .................... 83/169 |
| 3,848,929 | 11/1974 | Miller ......................... 83/169 |
| 3,961,548 | 6/1976 | Claassen ..................... 83/169 |
| 4,136,590 | 1/1979 | Kordyban et al. .......... 83/169 |
| 4,333,371 | 6/1982 | Matsuda ...................... 83/169 |
| 4,516,560 | 5/1985 | Cruickshank et al. ....... 125/15 |
| 4,574,676 | 3/1986 | Jansen-Herfeld ............ 83/835 |
| 4,635,513 | 1/1987 | McGeehee ................... 83/869 |
| 4,662,259 | 5/1987 | Dutina ......................... 83/821 |

(List continued on next page.)

FOREIGN PATENT DOCUMENTS

| | | | |
|---|---|---|---|
| 117068 | 6/1986 | Japan ......................... 125/15 |

*Primary Examiner*—M. Rachuba
*Attorney, Agent, or Firm*—Kennedy Covington Lobdell & Hickman

[57] ABSTRACT

A saw arrangement includes the combination of a circular saw blade and a lubricating guide support assembly. The circular saw blade includes a saw plate having openings formed therein and carbide insert teeth disposed circumferentially about the saw plate. The lubricating guide support assembly includes two guide supports each having a bearing surface disposed immediately adjacent opposite sides of the saw plate at a spacing to the cutting area for proper alignment of the saw blade during cutting. At least one of the guide supports includes a recessed area containing liquid exposed to the saw plate whereat a thin film of the liquid is applied to the saw plate as it passes by the recessed area during cutting. The openings are arranged on the saw plate to pass by the recessed area and are dimensioned to receive liquid therein for transport away from the recessed area. When each opening clears the bearing surfaces of the guide supports the liquid transported therein is distributed to the saw plate and the cutting area including the carbide insert teeth by air turbulence and inertial forces. Such a saw blade having a thickness at least as small as 0.080 inches is used to cut lumber from Southern Yellow Pine.

20 Claims, 4 Drawing Sheets

U.S. PATENT DOCUMENTS

| | | | |
|---|---|---|---|
| 4,715,254 | 12/1987 | DeGan | 83/169 |
| 4,776,251 | 10/1988 | Carter, Jr. | 83/835 |
| 4,848,200 | 7/1989 | McGehee | 83/169 |
| 4,961,359 | 10/1990 | Dunham | 83/169 |
| 5,038,474 | 8/1991 | Larsson et al. | 30/389 |
| 5,088,363 | 2/1992 | Jones et al. | 83/35 |
| 5,159,866 | 11/1992 | Dunham | 83/169 |
| 5,331,743 | 7/1994 | Lump | 30/388 |
| 5,351,595 | 10/1994 | Johnston | 83/848 |
| 5,479,911 | 1/1996 | Levinson et al. | 125/15 |
| 5,611,724 | 3/1997 | DeGraaf | 451/53 |
| 5,722,474 | 3/1998 | Raybon et al. | 144/357 |
| 5,761,979 | 6/1998 | McGehee | 83/425.3 |

SAW BLADE HAVING LIQUID TRANSPORT CAVITY FOR USE WITH LUBRICATING GUIDE SUPPORT ASSEMBLY

FIELD OF THE PRESENT INVENTION

The present invention relates to a saw arrangement and, in particular, to a saw blade having a liquid transport cavity for use with a lubricating guide support assembly.

BACKGROUND OF THE PRESENT INVENTION

Saw blades are commonly used to cut raw materials into intermediate or final products, and as the width of the saw blade is decreased, more product can be cut generating higher productivity. As an example, a simple arrangement of circular saw blades mounted on an arbor were once often used to cut pieces of lumber. In such arrangements which were used for cutting Southern Yellow Pine, the typical width of each circular saw blade was approximately 0.180 inches.

An improvement that was made in this simple arrangement is the provision of a guide support assembly comprising two guide supports with opposed bearing surfaces for maintaining proper alignment of each circular saw blade therebetween during cutting, thereby permitting the reduction of the thickness of the saw blade to dimensions that would have otherwise compromised cutting alignment. The guide support assembly is required because the circular saw blades have been reduced to a thickness rendering them incapable of maintaining a generally planar configuration during cutting, thereby making them unsuitable for use without auxiliary side support. Unfortunately, as saw blade thickness decreases more support must be provided by the bearing surface of the guide support against the saw blade which generates greater friction therebetween. This increase in friction can lead to excessive heating of the saw blade which, in turn, can ultimately lead to carbide insert teeth breakage, sawing deviation, guide pad wear, and saw blade damage.

Further improvements to this saw arrangement were made in the late 1980's. In a first improvement, cooling of the saw blade is accelerated by the provision of circumferential air slots throughout the saw body, of which the saw blade disclosed in Carter Jr. U.S. Pat. No. 4,776,251 is representative. In Carter Jr. a circular saw blade is disclosed having slots cut in the body thereof using a laser. Each slot consists of an arc of a circle concentric with the saw body and parallel to the peripheral edge of the saw body. The radial width of the slot is selected to be between 0.002 and 0.015 inches and remains constant in the circumferential direction of the saw body between opposed circumferential ends of the slot. The common problem of sawdust packing in similar openings formed in a saw body, as disclosed for example in Jansen-Herfeld U.S. Pat. No. 4,574,676 and as expressly discussed by Carter Jr. at cols. 3–4, is avoided in the circular saw blade of Carter Jr. because of the limitation on the radial width of each slot to less than 0.015 inches and because of the disposition of the slots in a circumferential direction with no radial component. Furthermore, unlike the blade disclosed in Jansen-Herfeld, the circular saw blade of Carter Jr. can be used with guide supports without damaging the bearing surfaces thereof due to the narrowness of each slot and its circumferential arrangement. In this arrangement, the plurality of slots provide a radiator cooling effect that accelerates cooling of the saw blade but the slots fail to reduce any friction generated between the saw body and the bearing surface of the guide supports.

In a second, independent improvement to the saw arrangement having guide supports, an actual reduction of the friction between the saw blade and the guide supports is accomplished by the application within each guide support of a lubricating liquid to the saw body. A conventional saw arrangement including a representative illustration of this improvement is disclosed in McGehee U.S. Pat. No. 4,848,200. In this saw arrangement a mixture of oil and water is applied to a saw body of a circular saw blade as it passes by guide supports retaining the saw blade in proper cutting alignment. Typically the liquid is delivered to a recessed opening in each guide support under a pressure of 35 psi and the guide support is maintained immediately adjacent the saw body at a gap of between 0.001 and 0.003 inches, whereby a thin film of liquid is applied to the saw body as it passes thereby. The application of a lubricating liquid reduces friction—and thus heat—generated between the guide supports and the saw body.

As a result of such improvements in saw arrangements having guide support assemblies, the conventional thickness of a saw blade in a saw arrangement used to cut Southern Yellow Pine has been reduced from 0.180 inches to 0.080 inches. Nevertheless, a need has arisen in recent years to reduce the thickness of a circular saw blade for cutting Southern Yellow Pine still further as demand for greater productivity in lumber mills has arisen. Such attempts at thinner saw blades generally have been unsuccessful due to insufficient cooling and consequent overheating, and better cooling techniques must be developed to advance this sought-after reduction in saw blade thickness.

SUMMARY OF THE PRESENT INVENTION

The present invention exhibits improved cooling of a saw blade retained in proper cutting alignment by lubricating saw guide supports, thereby advancing attempts to reduce saw blade thickness. In particular, the present invention, when used to cut Southern Yellow Pine, has been found (among other advantages): to provide less maintenance than conventional saw blades; to provide less entailed maintenance operations when maintenance is required than that of conventional saw blades; and to provide a longer operating life than conventional.

Briefly described, the present invention relates to a saw arrangement comprising the combination of a saw blade and a lubricating guide support assembly including two guide supports having opposed bearing surfaces for maintaining the saw blade in proper cutting alignment therebetween. The saw blade includes a saw body that defines a cavity therein and a cutting edge disposed along a periphery of the saw body for cutting during movement of the saw blade. Each guide support includes the bearing surface being disposed immediately adjacent the saw body for support of the saw blade during cutting as well as a lubricating system comprising a recessed area extending from the bearing surface and containing liquid exposed to the saw body, whereby the liquid is applied to the saw body as it passes by the recessed area during movement of the saw blade.

In a feature of the present invention, the cavity is arranged on the saw body to pass by the recessed area during movement of the saw blade and is dimensioned to receive liquid therein for transport away from the recessed area to be distributed to the saw body as well as a cutting area of the saw blade. Preferably, the saw blade is circular, and the saw body is planar and includes three cavities disposed relative to one another at 120 degrees about the center of the saw blade. Each cavity is triangular in cross-section and extends from a first planar side of the saw body to a second planar side thereof. Also, each cavity preferably includes only rounded corners, and each cavity preferably has a radial dimension that varies along a circumferential direction of the circular saw blade between opposed circumferential ends of the cavity.

The present invention also relates to a method of using a circular saw blade itself with a lubricating guide support assembly to cut lumber from Southern Yellow Pine. In particular, the circular saw blade includes a planar saw body having an axial thickness of no greater than 0.080 inches and defines a cavity therein having a radial dimension that varies along a circumferential direction of the circular saw blade between opposed circumferential ends of the cavity. The cavity itself preferably includes a radial dimension greater than 0.015 inches sufficient to receive liquid therein when passing by a recessed area of a lubricating guide support.

The present invention further relates to a method for distributing lubricating and cooling liquid to a cutting area of a saw blade used in combination with a lubricating guide support assembly. In particular, the method includes the steps of delivering liquid into a recessed area of the lubricating guide support, filling a cavity of the saw body with the liquid by passing the cavity immediately adjacent the recessed area, and transporting the liquid away from the recessed area by continuing to move the cavity from the recessed area towards the cutting area. The transported liquid passes from the cavity when the cavity moves beyond the bearing surface as a result of air turbulence and inertial forces, and the liquid is consequently distributed both to the saw body of the blade as well as to the cutting area thereof including the carbide insert teeth of the saw blade.

BRIEF DESCRIPTION OF THE DRAWINGS

Other features and advantages of the present invention will become apparent to one having ordinary skill in the art in view of the following disclosure of the preferred embodiment of the present invention and with reference to the drawings, in which.

DETAILED DESCRIPTION OF THE PREFERRED EMBODIMENT

Figure 1:
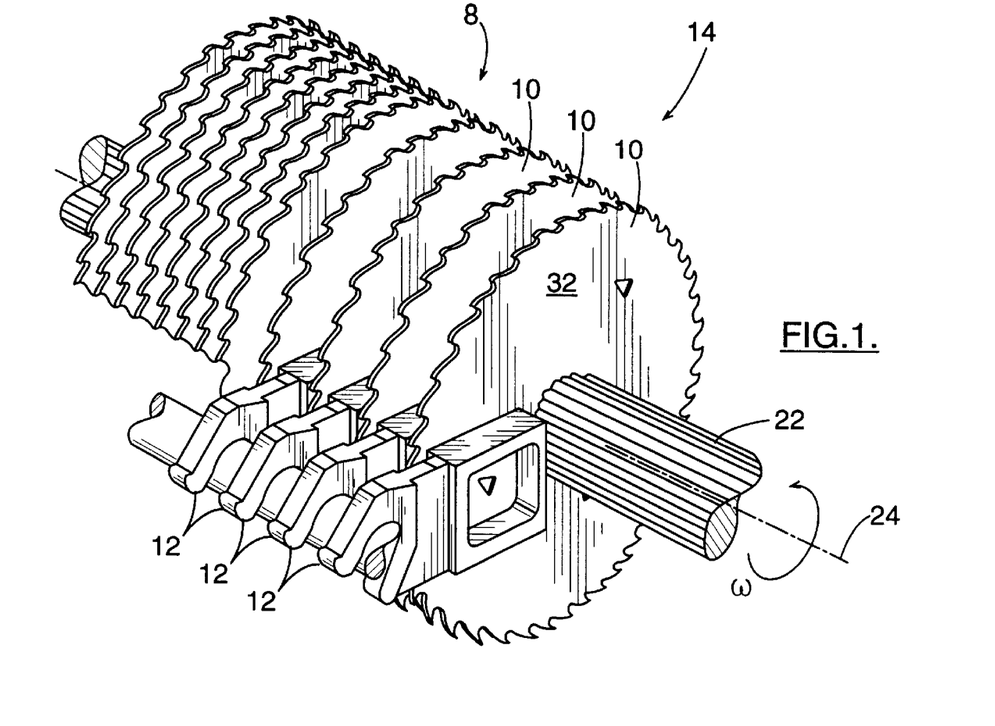
FIG. 1 is a perspective partial view of a saw arrangement of the present invention including a plurality of circular saw blades and lubricating guide support assemblies therefor.

Referring now to the drawings, the present invention relates broadly to a saw arrangement 8 including the combination of a circular saw blade 10 and a lubricating guide support assembly 12. As shown in FIG. 1, this combination can be repeated to form what is commonly known as a horizontal gang saw 14 in the lumber industry. In each combination, and with reference to FIG. 3, the saw blade 10 includes a cutting edge 16 comprised of carbide insert teeth 18 for cutting during rotation of the saw blade 10. The saw blade 10 also includes a central opening 20 by which the saw blade 10 is mounted to an arbor 22 extending along an axis 24 that simultaneously drives each saw blade 10 by rotation in a circumferential direction $\omega$. The rotation of the saw blades 10 generates the cutting action of the gang saw 14 for the cutting of lumber in a cutting area (generally indicated at 26).

Preferably each circular saw blade 10 includes a planar saw body 28 having a diameter of 18½ inches and a thickness in an axial direction of 0.080 inches or less. Furthermore, each planar saw body 28 preferably defines three liquid transport cavities 30 therein which extend entirely through the axial extent of the saw body 28 from a first planar surface 32 thereof to a second planar surface 34 thereof. Moreover, the three cavities 30 are preferably equally spaced from the others around the axial center of the saw body 28, i.e., spaced 120 degrees apart. Each cavity 30 is also triangular in cross section in the embodiment shown, but other shapes are equally applicable.

Figure 5:
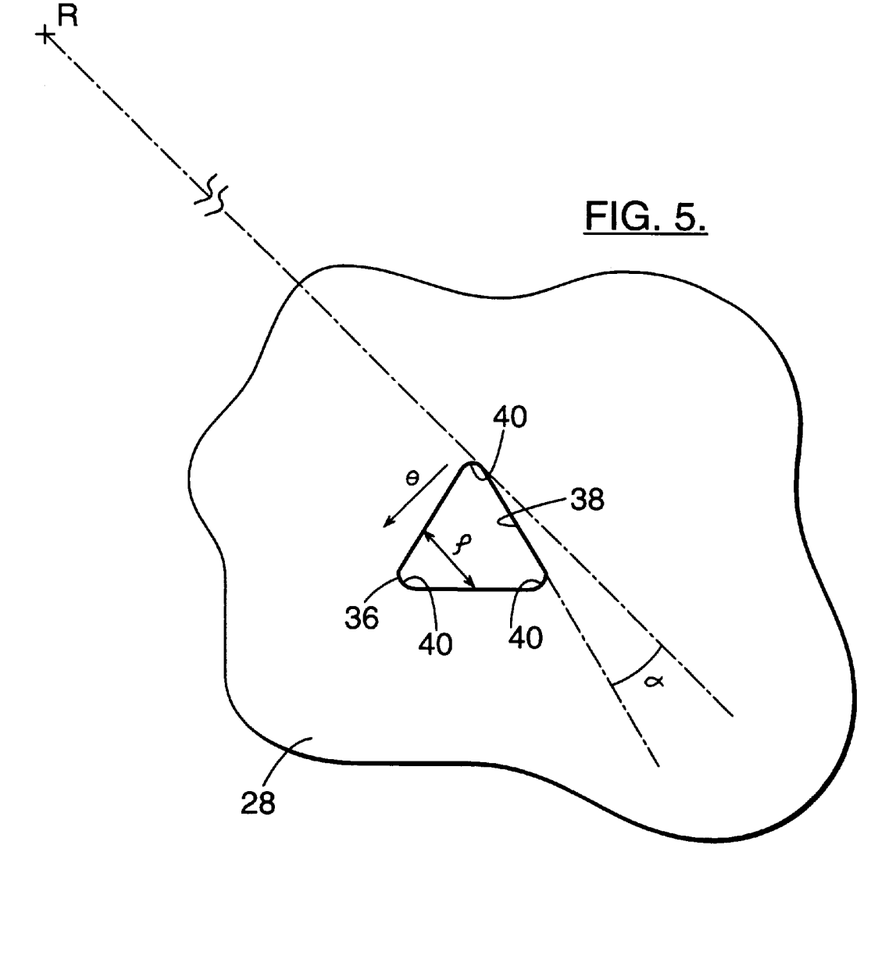
FIG. 5 is an enlarged view of a section of the circular saw blade of FIG. 3 including a cavity of the present invention.

Regardless of the actual cross-sectional shape of the cavity 30 that is used, the cavity 30 preferably includes a radial dimension $\rho$ that varies along a circumferential direction $\theta$ of the circular saw blade 10 between opposed circumferential ends 36, 38 of the cavity 30 as shown in FIG. 5. The radial dimension $\rho$ also preferably exceeds 0.015 inches whereby the cavity 30 has sufficient dimension to readily receive liquid therein; it is noted that the laser cut slots of Carter Jr. U.S. Pat. No. 4,776,251 have a radially dimension less than 0.015 inches and, therefore, are of an insufficient width to receive liquid from the recessed area (just as sawdust packing is avoided by such a small width).

Each cavity 30 in the present invention also preferably includes rounded corners 40 each having a radius of, for example, ³⁄₁₆ of an inch. A trailing edge 42 of the cavity 30 is also preferably oriented at a negative angle $\alpha$ of preferably 5 degrees with respect to a radius R of the saw blade 10. These design configurations for the cavity 30 of the present invention prevent sawdust packing and enhance liquid distribution to the saw body 28 and cutting area 26 as discussed in detail below.

Figure 2:
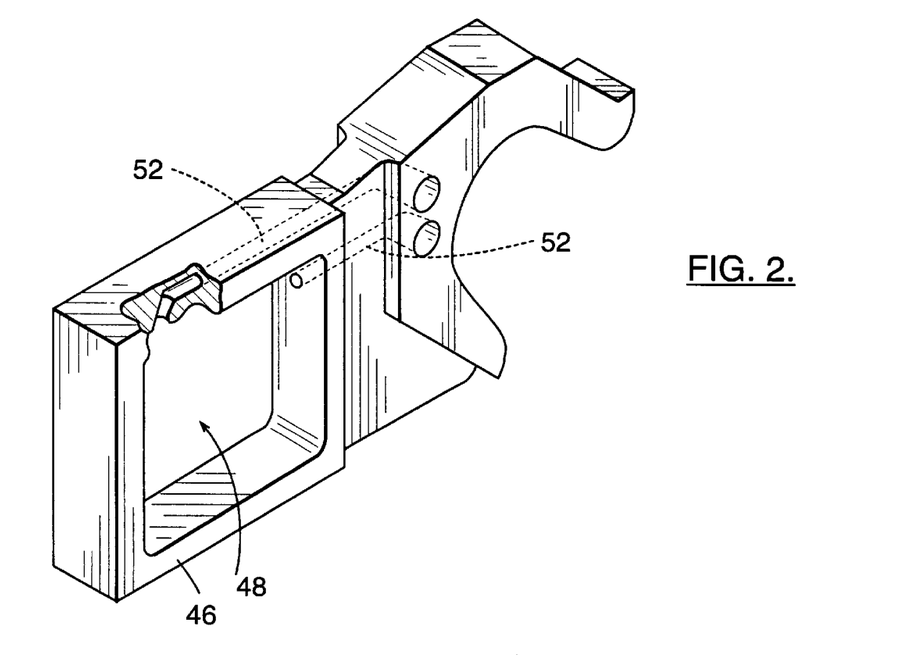
FIG. 2 is a perspective partial view of a guide support of a guide support assembly of FIG. 1.

The lubricating guide support assembly 12 includes a plurality of guide supports 44. As shown in FIG. 2, each guide support 44 includes a bearing surface 46 disposed immediately beside an adjacent saw blade 10 for proper alignment and support of the saw blade 10 during cutting. Each guide support 44 also includes a separate bearing surface 46 for each adjacent saw blade 10. Furthermore, each bearing surface 46 generally is spaced approximately 0.002 inches from an adjacent saw body 28 when no cutting is being performed.

Figure 4:
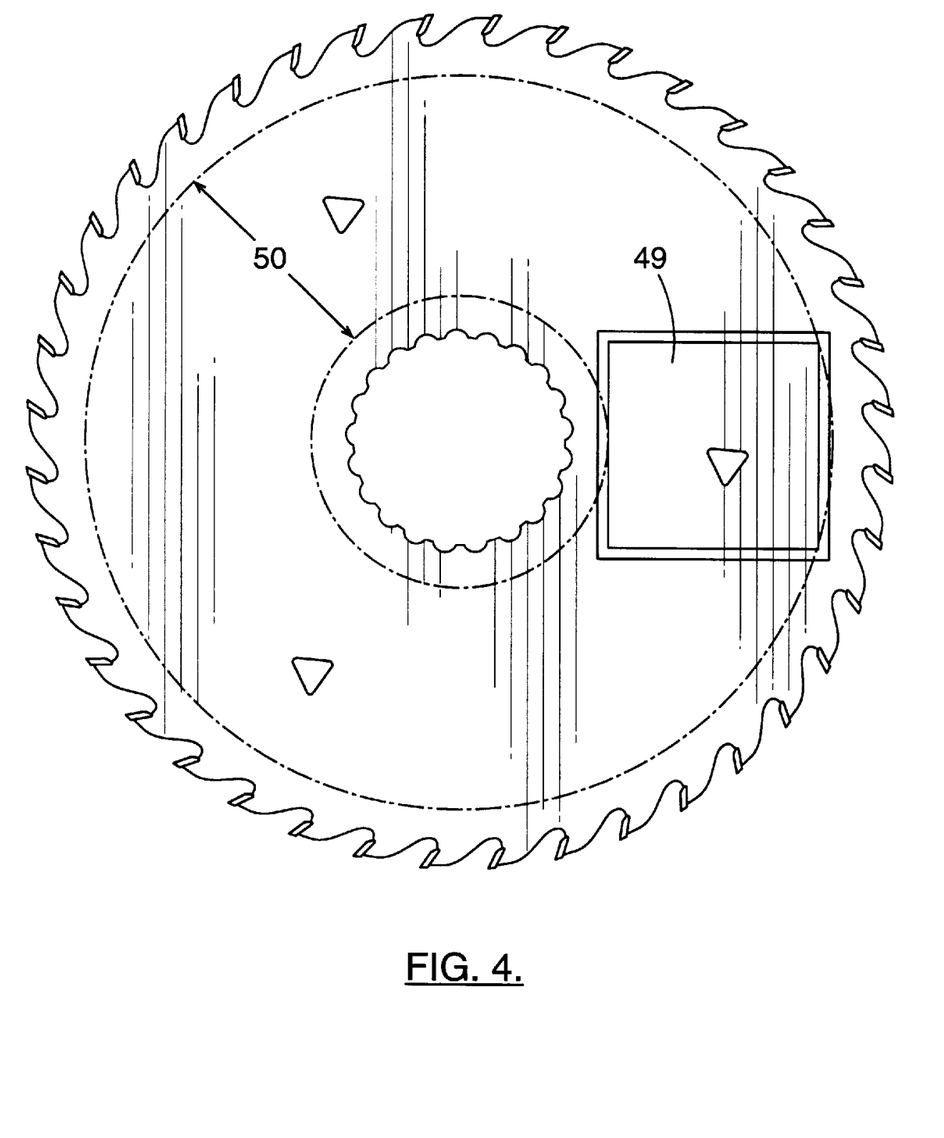
FIG. 4 is an additional plan view of the circular saw blade of FIG. 3.

The guide support 44 includes a liquid lubricating system comprising a recessed area 48 extending within the guide support 44 between bearing surface 46 thereof. The recessed area 48 is filled with a liquid under a pressure of approximately 35 psi that is exposed to the adjacent saw bodies 28, whereby a thin film of liquid is applied to each saw body 28 as it passes by the recessed area 48 during rotation of the saw blade 10. As illustrated by the square area 49 of FIG. 4 corresponding to an area of the saw body 28 exposed to the liquid in the recessed area 48, the recessed area 48 preferably covers in one rotation of the saw blade 10 a large portion of an annular section of the saw body defined by dashed lines 50 thus providing for wide coverage of the saw body 28. The liquid is pumped under pressure to the recessed area 48 through passageways 52 and the liquid itself generally comprises an oil/water mixture, the oil being used for lubrication and the water being used for cooling.

Figure 3:
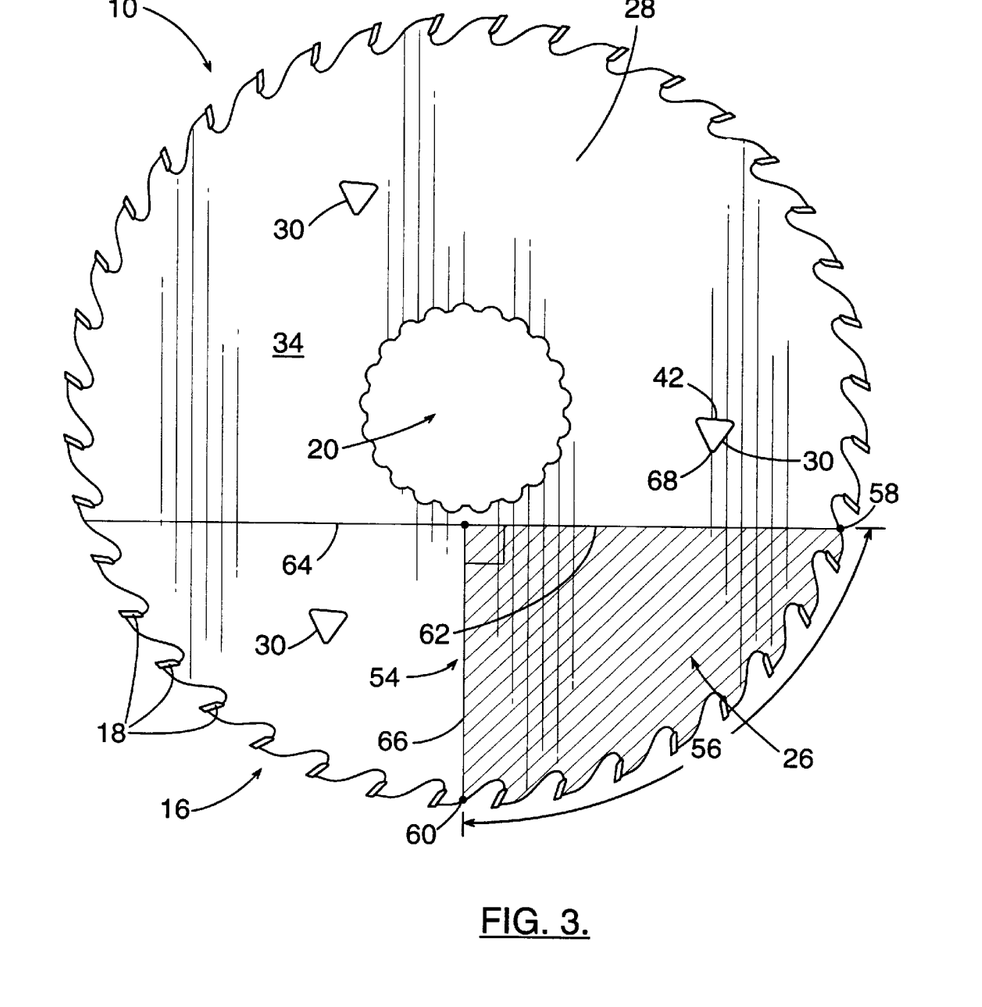
FIG. 3 is a plan view of a circular saw blade of FIG. 1.

It has been determined by experiment that the total opening area of the cavities 30 preferably should minimally approximate 6% of a "cutting triangle" of the circular saw blade 10. As illustrated in FIG. 3, the cutting triangle 54 is an approximate right triangle having an arc 56 of the cutting edge 16 as a hypotenuse. In particular, the arc 56 extends between a first vertex 58 defined by the point where a carbide insert tooth enters the cant, and a second vertex 60 defined by the point where another carbide insert tooth simultaneously exits the cant. A first leg 62 lies along a bedplate 64 of the saw arrangement 8 and includes the first vertex 58, and a second leg 66 lies perpendicular to the bedplate and includes the second vertex 60. In the circular saw blades 10 of the drawings each cavity 30 is preferably identical to the others and includes an opening area approximately equal to 2% of the area of the cutting triangle 54.

Operation of the saw arrangement 8 and circular saw blade 10 of the present invention will now be described.

During rotation of the arbor 22, each saw blade 10 of the gang saw 14 is simultaneously rotated while liquid is delivered under pressure into the recessed area 48 of each guide support 46. The rotation of the saw body 28 past the recessed area 48 and the disposition of the bearing surface 46 of each guide support 44 immediately adjacent the saw body 28 in conjunction with the pressurized liquid in the recessed area 48 results in a thin film of liquid initially being applied to the annular section defined by the dashed lines 50 shown in FIG. 4.

Each cavity 30 is formed in each saw body 28 in this annular section defined by dashed lines 50 whereby each cavity 30 will pas by the recessed area 48 during rotation of the saw blade 10 as illustrated in FIG. 3. As the cavity 30 passes by the recessed area 48 the pressurized liquid is driven into the cavity 30 and transported away from the recessed area 48 toward the cutting area 26. Once the cavity 30 clears the bearings surface 46 of the guide support 44, air turbulence and inertial forces cause the transported liquid to pass out of the cavity 30 for distribution to the saw body 28 and the cutting area 26 including the cutting edge 16 of the saw blade 10 both before and within the cant. The distribution of liquid to the saw body 28 and to the cutting area 26 is thereby increased as opposed to simply applying a liquid film to the annular section define by dashed lines 50.

The design configurations of each cavity 30 set forth above enhance this liquid distribution and prevent sawdust packing. In particular, due to the radial variance of ρ in the dimension of the cavity 30, the cavity 30 is narrower at the leading point first 68 passing by the recessed area 48 and grows radially larger circumferentially along the saw body 28. This narrow-to-wide transition, in conjunction with the rounded corners 40 and negative angle a of the trailing edge 42 of the cavity 30, draws the liquid into the cavity 30 and, when the cavity 30 clears the bearing surface 46, draws air into the cavity 30 displacing the liquid carried therein out of the cavity 30 in what is believed to be a vortex or swirling action. It has also been observed that the trailing edge 42, because of its angled orientation to the radius R of the blade 10, enhances distribution of the liquid toward the center of the saw body 28 before inertial forces draw the liquid in a direction from the center of the saw body 28 towards the cutting edge 16. Moreover, during its pass through the cant, sawdust is driven towards the angled trailing edge 42 and is deflected thereby without finding niches to accumulate within, especially since the corners 40 of the cavity 30 are rounded. Thus, among other benefits of the present invention, sawdust packing is avoided without unduly limiting the radial dimension ρ of the cavity 30 to a constant value less than 0.015 inches as taught by Carter Jr. Moreover, it is noted that a narrow slot as disclosed by Carter Jr. would not draw the required liquid therein while passing by the recessed area 48 of the present invention.

In specific comparison of the saw arrangement against the lubricating guide blocks of McGehee and a saw blade as taught by Carter Jr., Applicant has found that the saw arrangement 8 of the present invention is clearly superior. In particular, following cutting of lumber from Southern Yellow Pine, a layer of liquid along the cut lumber and relatively cool sawdust both were observed using the saw arrangement 8 of the present invention, but no liquid layer and relatively hot sawdust both were observed using the saw blade of Carter Jr. with the lubricating guide blocks of McGehee. Carbide teeth breakage was also encountered using the saw blade of Carter Jr. with the lubricating guide blocks of McGehee, but was not encountered under identical circumstances using the saw arrangement 8 of the present invention.

The saw blade 10 of the present invention also exhibits easier maintenance than other conventional saw blades. In particular, the rounded corners 40 and size of each cavity 30 allow for easier clean out and reshaping of the cavity 30 by a saw filer. For instance, the heating and cooling of the saw blade 10 causes the area of the saw body 28 defining the cavities 30 to harden, becoming brittle and cracking over time. By further rounding the cavities 30, the saw filer is able to file away these hardened areas without significantly altering the shape of the cavity 30. The filer can also refurbish openings defining the cavities 30 where the edges have been worn by friction, maintaining the integrity of the saw body 28 and the effectiveness of the liquid transporting capabilities of the cavities 30.

Another benefit of the present invention over conventional saw arrangements including liquid lubrication guide supports such as that disclosed in McGehee is the reduction in the accumulation time of the liquid within the recessed area 48 due to the additional removal of the liquid from the recessed area 48 by the cavities 30. Reduction of the time of the liquid within the recessed area 48 reduces the time in which the liquid within the recessed area 48 is thermally exposed to the guide support 44 and subjected to heat transfer via convection resulting from the abutment between each bearing surface 46 with an adjacent saw body 28.

In sum, the liquid transport cavities of the present invention achieve a degree of cooling not obtained by the aforementioned conventional saw arrangements and provide greater operating life and easier and less maintenance than that of other conventional saw blades. Furthermore, the improved cooling benefits of the present invention further the attempt to reduce saw blade thickness below the current floor of 0.080 inches for saw blades used with guide supports to cut lumber from Southern Yellow Pine.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

Thus, it will be apparent, for example, that the liquid passageways of the guide supports could deliver the liquid under pressure directly to the saw body in the manner of liquid ports forming the recessed area of the guide supports, with the liquid transport cavities passing by the liquid ports for receipt of liquid directly therein. The cavities also do not have to extend entirely through the saw body, although better distribution of the liquid carried therein to the saw body and the cutting area is achieved when air turbulence passes through the saw body. Moreover, the configuration of the cavity need not be triangular in cross-section nor have only rounded corners therein. It is only a requirement that the cavities be of sufficient area and dimension to receive a quantity of liquid therein from the guide supports as it passes thereby for delivery to the saw body and cutting area. It should also be apparent that while a horizontal gang saw has been used to illustrate the preferred embodiment of the present invention, the present invention is equally applicable to vertical gang saws or to single blade rip saws, whether vertically or horizontally disposed.

What is claimed is:

1. A saw arrangement comprising the combination of:
    a saw blade including a saw body defining a cavity therein, and a cutting edge disposed along a periphery of said saw body for cutting during movement of said saw blade, said cavity being disposed entirely within an annular section of said saw body and completely bounded by said saw body thereby isolating said cavity from said cutting edge; and
    a lubricating guide support having a bearing surface disposed immediately adjacent said saw body for proper alignment of said saw blade during cutting, said guide support containing liquid exposed to said saw body at said bearing surface whereby the liquid is applied to said saw body as it passes by said bearing surface during movement of said saw blade, said cavity arranged on said saw body to pass by said exposed liquid during movement of said saw blade and dimensioned to receive liquid therein for transport of the liquid away from said bearing surface.

2. A saw arrangement according to claim 1, wherein said cavity includes a radial dimension greater than 0.015 inches sufficient to receive liquid therein for transport away from said bearing surface.

3. A saw arrangement according to claim 1, wherein said saw body has a thickness less than 0.080 inches.

4. A circular saw arrangement comprising the combination of:
    a circular saw blade including a planar saw body defining a liquid transport cavity therein, and a circular cutting edge disposed circumferentially about said saw body for cutting at a cutting area during rotation of said saw blade, said cavity being disposed entirely within an annular section of said saw body and completely bounded by said saw body thereby isolating said cavity from said cutting edge; and
    a lubricating guide support assembly including two guide supports each having a bearing surface disposed immediately adjacent opposite planar sides of said saw body for proper alignment of said saw blade during cutting, at least one of said guide supports including a recessed area containing liquid exposed to said saw body whereat a thin film of the liquid is applied to said saw body as it passes by said recessed area during rotation of said saw blade, said liquid transport cavity arranged on said saw body to pass by said recessed area during rotation of said saw blade and dimensioned to receive liquid therein for transport away from said recessed area.

5. The circular saw arrangement of claim 4, wherein said liquid transport cavity includes a radial dimension greater than 0.015 inches sufficient to receive liquid therein for transport of the liquid away from said recessed area.

6. The circular saw arrangement of claim 4, wherein said planar saw body defines a plurality of liquid transport cavities.

7. The circular saw arrangement of claim 4, wherein said liquid transport cavity extends through said planar saw body from a first said side thereof to a second said side thereof.

8. The circular saw arrangement of claim 4, wherein said liquid transport cavity is triangular in cross-section.

9. The circular saw arrangement of claim 4, wherein said circular saw body includes three liquid transport cavities spaced 120 degrees to one another about a center of said circular saw body.

10. The circular saw arrangement of claim 4, wherein said planar saw body has an axial thickness no greater than 0.080 inches.

11. The circular saw arrangement of claim 4, wherein said liquid transport cavity includes a radial dimension that varies along a circumferential direction of said circular saw body between opposed circumferential ends of said liquid transport cavity.

12. The circular saw arrangement of claim 4, wherein said cavity includes corners all of which are rounded.

13. The circular saw arrangement of claim 4, wherein each said bearing surface is disposed approximately 0.002 inches from said saw body.

14. The circular saw arrangement of claim 4, wherein said liquid transport cavity has a triangular cross-section, a trailing edge of which is oriented at negative 5 degrees to a radius of the saw body.

15. A method for cutting lumber from Southern Yellow Pine including the steps of providing a saw arrangement including a circular saw blade and lubricating saw guides, the circular saw blade including a planar saw body having an axial thickness less than 0.080 inches and defining a cavity therein having a radial dimension that varies along a circumferential direction of said circular saw body between opposed circumferential ends of said cavity; and cutting the Southern Yellow Pine into lumber using said saw arrangement.

16. The circular saw blade of claim 15, wherein said cavity includes corners all of which are rounded.

17. The circular saw blade of claim 15, wherein said cavity is triangular in cross-section.

18. The circular saw blade of claim 15, wherein said planar saw body includes two additional cavities identical to the first said cavity, said three cavities consecutively spaced 120 degrees apart with respect to a center of said circular saw blade.

19. The circular saw blade of claim 18, wherein each said cavity is triangular in cross-section.

20. A method of delivering liquid to a cutting area of a saw blade including the steps of:
    (i) providing a saw arrangement including the combination of:
        a saw blade including a saw body defining a cavity therein and including a cutting edge disposed along a periphery of the saw body for cutting at a cutting area during movement of the saw blade, the cavity being disposed entirely within an annular section of the saw body and completely bounded by the saw body thereby isolating the cavity from the cutting edge, and a lubricating guide support assembly including two guide supports each having a bearing surface disposed immediately adjacent opposite sides of the saw body at a spacing to the cutting area for proper alignment of the saw blade during cutting, at least one of the guide supports including a recessed area extending from the bearing surface and containing liquid exposed to the saw body, the cavity arranged on the saw body to pass by the recessed area during movement of the saw blade and dimensioned to receive liquid therein for transport of the liquid away from the recessed area;

(ii) delivering liquid into the recessed area;

(iii) filling the cavity with the liquid by moving the cavity by the recessed area; and (iv) transporting the liquid away from the recessed area by continuing to move said filled cavity from the recessed area towards the cutting area, said transported liquid passing from said filled cavity when said filled cavity clears the bearing surface as a result of air turbulence and inertial forces.

* * * * *